US011609028B2

(12) United States Patent
Wu

(10) Patent No.: US 11,609,028 B2
(45) Date of Patent: Mar. 21, 2023

(54) LIQUID AMMONIA, SODIUM NITRATE AND LITHIUM BROMIDE ABSORPTION REFRIGERATION SYSTEM

(71) Applicant: Wuyi University, Jiangmen (CN)

(72) Inventor: Min Wu, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 200 days.

(21) Appl. No.: 17/320,473

(22) Filed: May 14, 2021

(65) Prior Publication Data

US 2022/0057116 A1     Feb. 24, 2022

(30) Foreign Application Priority Data

Aug. 21, 2020   (CN) .......................... 202010847389.9

(51) Int. Cl.
| | |
|---|---|
| *F25B 15/06* | (2006.01) |
| *C09K 5/04* | (2006.01) |
| *C09K 5/10* | (2006.01) |
| *F25B 37/00* | (2006.01) |

(52) U.S. Cl.
CPC .............. *F25B 15/06* (2013.01); *C09K 5/047* (2013.01); *C09K 5/10* (2013.01); *F25B 37/00* (2013.01); *C09K 2205/132* (2013.01)

(58) Field of Classification Search
CPC .......... F25B 15/06; F25B 15/02; F25B 15/04; F25B 37/00; F25B 33/00; F25B 41/00; F25B 43/006; C09K 5/047; C09K 5/10; C09K 2205/132; Y02P 20/10; Y02A 30/27; Y02B 30/62
See application file for complete search history.

(56) References Cited

FOREIGN PATENT DOCUMENTS

| | | | |
|---|---|---|---|
| CN | 104633981 B | * 10/2016 | |
| DE | 102005032764 A1 | * 1/2007 | .......... F24D 11/0221 |

\* cited by examiner

*Primary Examiner* — Emmanuel E Duke
(74) *Attorney, Agent, or Firm* — Vivacqua Crane, PLLC

(57) ABSTRACT

Disclosed is a refrigeration system, including: a generator having a liquid storage cavity for containing a liquid ammonia and sodium nitrate solution, a heat source being connected to the generator and an exhaust pipe being arranged at the upper end of the generator; a condenser having a condensation cavity, an inlet of the condensation cavity being communicated with the exhaust pipe; an evaporator having an evaporation cavity for containing hydrogen, an inlet of the evaporation cavity being communicated with an outlet of the condensation cavity through a liquid inlet pipe; an absorber located below the evaporation and having an absorption cavity for containing a sodium nitrate solution, an upper part of the absorption cavity being communicated with an outlet of the evaporation cavity through a mixed gas pipe, and the absorber being provided with a reflux pipeline which communicates the absorption cavity and the liquid storage cavity.

10 Claims, 1 Drawing Sheet

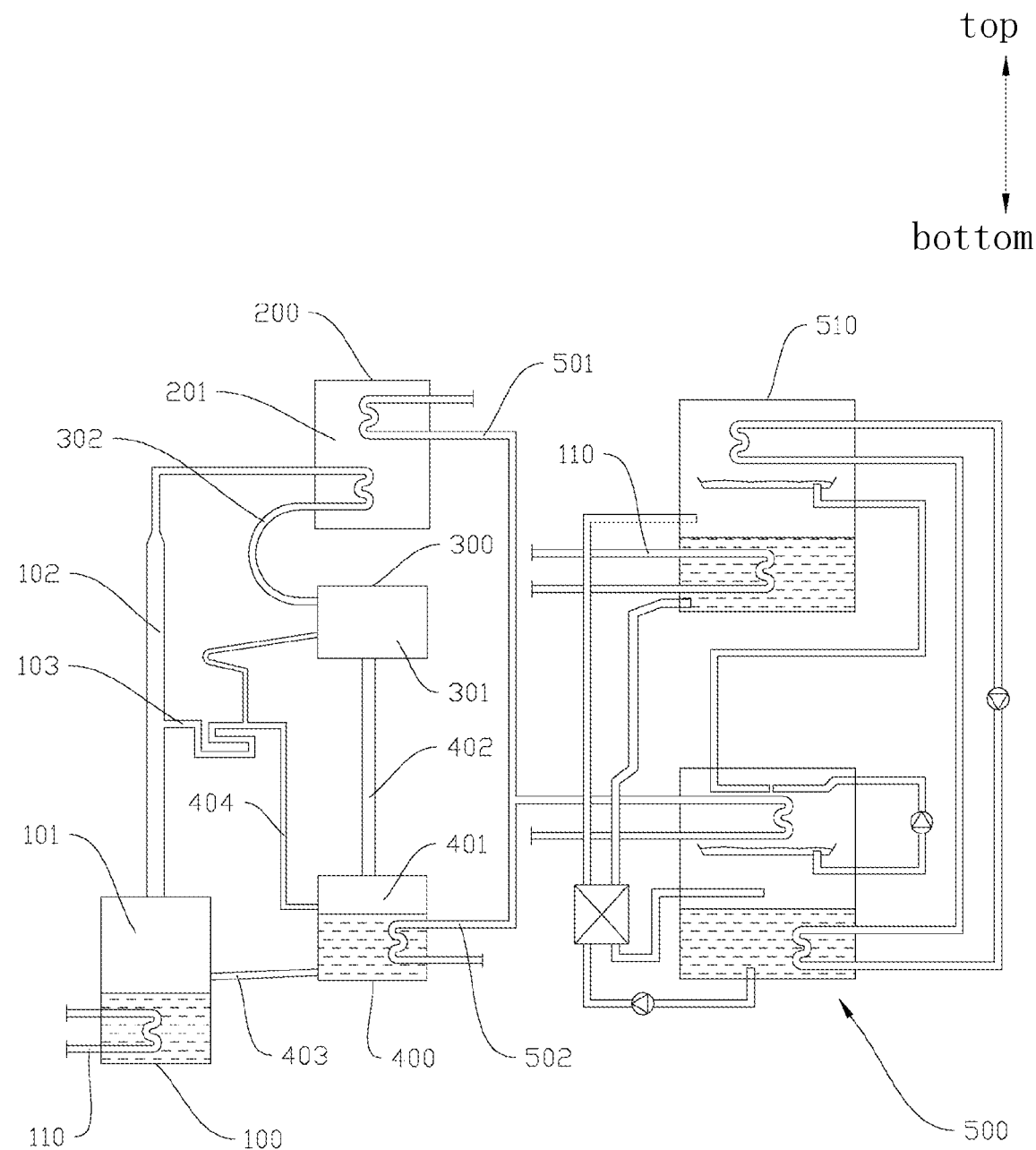

LIQUID AMMONIA, SODIUM NITRATE AND LITHIUM BROMIDE ABSORPTION REFRIGERATION SYSTEM

CROSS-REFERENCE TO RELATED APPLICATIONS

This application claims priority to Chinese patent application No. 202010847389.9, filed Aug. 21, 2020. The content of which is incorporated herein by reference in its entirety.

TECHNICAL FIELD

The present invention relates to the technical field of refrigeration, and more particularly, to a sodium nitrate-liquid ammonia diffusion-absorption refrigeration system.

BACKGROUND

Currently, there are several common absorption refrigeration methods, for example, ammonia-water absorption refrigeration and ammonia-hydrogen-water absorption-diffusion refrigeration. Although a refrigeration temperature of the ammonia-water absorption refrigeration can reach tens of degrees below zero, since ammonia and water, which tend to evaporate during heating, are used as a working pair for refrigeration, a rectification device is required, and the refrigeration efficiency is reduced. In contrast, in the ammonia-hydrogen-water diffusion refrigeration, a diffusing gas, i.e., hydrogen, is added as a balance gas based on ammonia-water absorption refrigeration. Because ammonia and water are still used as a working pair, the resulting disadvantage is similar to that of the ammonia-water absorption refrigeration. The COP is generally around 0.4, which is difficult to meet a large refrigeration demand.

SUMMARY

In order to address at least one of the technical problems in the existing technology, the present invention proposes a refrigeration system, which uses sodium nitrate and liquid ammonia as a working pair for refrigeration, thereby achieving a low refrigeration temperature and simplifying requirements for equipment.

A refrigeration system according to an embodiment of the present invention includes: a generator having a liquid storage cavity for containing a liquid ammonia and sodium nitrate solution, wherein a heat source is connected to the generator, and an exhaust pipe is arranged at an upper end of the generator; a condenser having a condensation cavity, wherein an inlet of the condensation cavity is communicated with the exhaust pipe; an evaporator having an evaporation cavity for containing hydrogen, wherein an inlet of the evaporation cavity is communicated with an outlet of the condensation cavity through a liquid inlet pipe; an absorber located below the evaporator and having an absorption cavity for containing a sodium nitrate solution, wherein an upper end of the absorption cavity is communicated with an outlet of the evaporation cavity through a mixed gas pipe, the absorber is provided with a reflux pipeline which communicates the absorption cavity and the liquid storage cavity; a lithium bromide-water refrigerating machine, wherein a first cold water pipe and a second cold water pipe are arranged at a cold water output end of the lithium bromide-water refrigerating machine, the first cold water pipe being connected to the condenser to cool a gas in the condensation cavity, and the second cold water pipe being connected to the absorber to cool the sodium nitrate solution in the absorption cavity; wherein, the absorber is provided with a gas return pipe that communicates the upper part of the absorption cavity and the evaporation cavity, and the exhaust pipe is provided with a bypass pipe that is communicated with the gas return pipe.

The refrigeration system according to the embodiment of the present invention at least has the following beneficial effects. The liquid ammonia-sodium nitrate diffusion refrigeration device uses sodium nitrate as an absorbent and liquid ammonia as a refrigerant, where sodium nitrate is a kind of salt with a boiling point of 380° C., which is very different from a boiling point of liquid ammonia, such that rectification equipment is eliminated, the system is simplified, and the cost is reduced. The constant-pressure specific heat is relatively large, which is beneficial to reduce a heat exchange area, miniaturize the equipment and reduce the occupied space. Liquid ammonia-sodium nitrate is an ideal working pair for absorption and refrigeration, and its COP can also meet higher requirements. The refrigeration can reach a temperature below zero to meet the larger refrigeration demand and provide a wider range of applications.

According to some embodiments of the present invention, the heat source is a hot water pipeline has a temperature of 110° C. or higher.

According to some embodiments of the present invention, the condenser is provided with an inclined gas inlet pipe, a low end of the gas inlet pipe being connected to the exhaust pipe, and a high end of the gas inlet pipe being located inside the condensation cavity.

According to some embodiments of the present invention, the first cold water pipe is provided with a coil in the condensation cavity.

According to some embodiments of the present invention, the bypass pipe has an S-shaped pipe section, and a high end of the S-shaped pipe section is connected to the gas return pipe.

According to some embodiments of the present invention, an upper end of the gas return pipe is an inclined pipe that is arranged obliquely, and a high end of the inclined pipe is connected to the evaporation cavity.

According to some embodiments of the present invention, a low end of the inclined pipe has a bent section.

According to some embodiments of the present invention, the reflux pipeline is inclined, and a low end of the reflux pipeline is connected to the liquid storage cavity.

According to some embodiments of the present invention, the lithium bromide-water refrigerating machine includes a second generator, which is connected to the heat source to realize heating.

According to some embodiments of the present invention, cold water output from the lithium bromide-water refrigerating machine has a temperature of 7° C. to 9° C.

The additional aspects and advantages of the present invention will be partly given in the following description, and partly will become obvious from the following description, or be understood through the practice of the present invention.

BRIEF DESCRIPTION OF THE DRAWINGS

The above and/or additional aspects and advantages of the present invention will become obvious and easy to understand from the description of the embodiments in conjunction with the following accompanying drawings, in which:

FIG. 1 is a schematic structural diagram of a refrigeration system according to some embodiments of the present invention.

DETAILED DESCRIPTION

A description will be made in detail to the embodiments of the present invention, examples of which are illustrated in the accompanying drawings. The reference numerals which are the same or similar throughout the accompanying drawings represent the same or similar components or components with the same or similar functions. The embodiments described below with reference to the accompanying drawings are exemplary, and are only intended to explain the present invention, rather than being construed as limitations to the present invention.

In the description of the present invention, it should be understood that the orientation or state relations indicated via terms of "upper", "lower", "front", "rear", "left", "right", and the like, that involve the description of orientations, are based on orientation or the state relations shown in the drawings only to describe the present invention conveniently and simplify the description, but not indicate or imply that referred devices or elements must have particular orientations or be constructed and operated with the particular orientation, so that they cannot be construed as limiting of the present invention.

In the description of the present invention, the terms "first" and "second" are, if any, only used for distinguishing the technical features, and cannot be understood as indicating or implying the relative importance, or implicitly specifying the number of the indicated technical features, or specifying the precedence relationship of the indicated technical features.

In the description of the present invention, unless otherwise clearly defined, terms such as "defined", "arranged", "mounted", and "connected" should be understood in a broad sense. Those skilled in the art can understand the specific meaning of the above terms in the present invention in accordance with specific content of the technical solutions.

Referring to FIG. 1, embodiments of the present invention provide a refrigeration system. The refrigeration system includes a generator 100, a condenser 200, an evaporator 300, an absorber 400 and a lithium bromide-water refrigerating machine 500. The generator 100 has a liquid storage cavity 101 for containing a liquid ammonia and sodium nitrate solution. A heat source 110 is connected to the generator 100, and an exhaust pipe 102 is arranged at an upper end of the generator 100. The condenser 200 has a condensation cavity 201, and an inlet of the condensation cavity 201 is communicated with the exhaust pipe 102. The evaporator 300 has an evaporation cavity 301 for containing hydrogen, and an inlet of the evaporation cavity 301 is communicated with an outlet of the condensation cavity 201 through a liquid inlet pipe 302. The absorber 400 is located below the evaporator 300 and has an absorption cavity 401 for containing a sodium nitrate solution. An upper end of the absorption cavity 401 is communicated with an outlet of the evaporation cavity 301 through a mixed gas pipe 402. The absorber 400 is provided with a reflux pipeline 403 which communicates the absorption cavity 401 and the liquid storage cavity 101. A first cold water pipe 501 and a second cold water pipe 502 are arranged at a cold water output end of the lithium bromide-water refrigerating machine 500, the first cold water pipe 501 being connected to the condenser 200 to cool a gas in the condensation cavity 201, and the second cold water pipe 502 being connected to the absorber 400 to cool the sodium nitrate solution in the absorption cavity 401. The absorber 400 is provided with a gas return pipe 404 that communicates an upper part of the absorption cavity 401 and the evaporation cavity 301, and the exhaust pipe 102 is provided with a bypass pipe 103 that is communicated with the gas return pipe 404. It is understood that the lithium bromide-water refrigerating machine 500 belongs to the existing technology, which will not be repeated here. The lithium bromide-water refrigerating machine 500 can produce cold water having a temperature of 7° C. for cooling the condenser 200 and the absorber 400.

Referring to FIG. 1, an operating process of the refrigeration system is as follows. The heat source 110 is used to heat the liquid ammonia and sodium nitrate solution in the liquid storage cavity 101. The liquid ammonia evaporates into ammonia gas when heated, and the ammonia gas moves upward through the exhaust pipe 102 into the condenser 200 and exchanges heat with the cold water in the first cold water pipe 501 in the condenser 200 to be condensed into liquid ammonia. Then, the liquid ammonia flows into the evaporation cavity 301 of the evaporator 300 through the liquid inlet pipe 302. Since the evaporation cavity 301 is filled with hydrogen, the liquid ammonia is reduced in pressure when encountering the hydrogen in the evaporation cavity 301 and evaporates into ammonia gas while absorbing heat from the surrounding environment, thereby realizing refrigeration. After that, under the action of gravity, the ammonia gas carries part of the hydrogen into the absorption cavity 401 of the absorber 400 along the mixed gas pipe 402, the hydrogen rises and returns to the evaporation cavity 301 along the gas return pipe 404, and the ammonia gas is absorbed by the sodium nitrate solution in the absorption cavity 401. In order to ensure the ability of the sodium nitrate solution to absorb the ammonia gas, the cold water in the second cold water pipe 502 is used to reduce the temperature of the sodium nitrate solution in the absorption cavity 401. The heat source 110 heats the liquid ammonia and sodium nitrate solution in the liquid storage cavity 101. A part of the sodium nitrate solution enters the absorption cavity 401 along the exhaust pipe 102, the bypass pipe 103, and the gas return pipe 404 due to a thermosiphon effect. The sodium nitrate solution that has absorbed the ammonia gas enters the liquid storage cavity 101 through the reflux pipeline 403, and the liquid ammonia and sodium nitrate solution is continuously circulated to absorb heat at the evaporator 300, thereby achieving refrigeration. The refrigeration system uses sodium nitrate as an absorbent and liquid ammonia as a refrigerant, where sodium nitrate is a kind of salt with a boiling point of 380° C., which is very different from a boiling point of liquid ammonia, such that rectification equipment is eliminated, the system is simplified, and the cost is reduced. The constant-pressure specific heat is relatively large, which is beneficial to reduce a heat exchange area, miniaturize the equipment and reduce the occupied space. Liquid ammonia-sodium nitrate is an ideal working pair for absorption and refrigeration, and its COP can also meet higher requirements. The refrigeration can reach a temperature below zero to meet the larger refrigeration demand and provide a wider range of applications.

Referring to FIG. 1, according to some embodiments of the present invention, the heat source 110 is a hot water pipeline has a temperature of 110° C. or higher. For example, an oil refinery workshop in the petrochemical industry can produce a large amount of steam condensate having a temperature of 120° C. per hour, while a dewaxing process in the oil refinery workshop requires refrigeration (the refrigeration temperature is −40° C. and −20° C.), and thus the refrigeration system of the present invention can be used.

Referring to FIG. 1, according to some embodiments of the present invention, the condenser 200 is provided with an inclined gas inlet pipe having a low end connected to the exhaust pipe 102, and a high end of the gas inlet pipe is located inside the condensation cavity 201. The inclined gas inlet pipe can make the ammonia gas accumulate and fill the gas inlet pipe, such that the flow rate is reduced, which is conducive to a cooling process of the ammonia gas in the condensation cavity 201.

Referring to FIG. 1, according to some embodiments of the present invention, the first cold water pipe 501 is provided with a coil in the condensation cavity 201. The coil increases a contact area and improves the capability to cool the ammonia gas.

Referring to FIG. 1, according to some embodiments of the present invention, the bypass pipe 103 has an S-shaped pipe section having a high end connected to the gas return pipe 404. The S-shaped pipe section facilitates the discharge of the ammonia gas in the pipe and reduces the entrainment of the ammonia gas into the absorption cavity 401.

Referring to FIG. 1, according to some embodiments of the present invention, an upper end of the gas return pipe 404 is an inclined pipe that is arranged obliquely, and a high end of the inclined pipe is connected to the evaporation cavity 301.

Referring to FIG. 1, according to some embodiments of the present invention, a low end of the inclined pipe has a bent section.

Referring to FIG. 1, according to some embodiments of the present invention, the reflux pipeline 403 is inclined, and a low end of the reflux pipeline 403 is connected to the liquid storage cavity 101, such that the sodium nitrate solution that has absorbed ammonia gas flows into the liquid storage cavity 101 automatically by gravity.

Referring to FIG. 1, according to some embodiments of the present invention, the lithium bromide-water refrigerating machine 500 comprises a second generator 510, which is connected to the heat source 110 to realize heating. The second generator 510 and the generator 100 share a common heat source to simplify the structure and improve the efficiency.

Referring to FIG. 1, according to some embodiments of the present invention, cold water output from the lithium bromide-water refrigerating machine 500 is 7° C. to 9° C.

The embodiments of the present invention are described in detail above with reference to the accompanying drawings. However, the present invention is not limited to the above-mentioned embodiments, and various changes can be made without departing from the purpose of the present invention within the scope of knowledge possessed by those having ordinary skill in the art.

I claim:

1. A refrigeration system, comprising:
   a generator having a liquid storage cavity for containing a liquid ammonia and sodium nitrate solution, wherein a heat source is connected to the generator, and an exhaust pipe is arranged at the upper end of the generator;
   a condenser having a condensation cavity, wherein an inlet of the condensation cavity is communicated with the exhaust pipe;
   an evaporator having an evaporation cavity for containing hydrogen, wherein an inlet of the evaporation cavity is communicated with an outlet of the condensation cavity through a liquid inlet pipe;
   an absorber located below the evaporation and having an absorption cavity for containing a sodium nitrate solution, wherein an upper end of the absorption cavity is communicated with an outlet of the evaporation cavity through a mixed gas pipe, and the absorber is provided with a reflux pipeline which communicates the absorption cavity and the liquid storage cavity; and
   a lithium bromide-water refrigerating machine, wherein a first cold water pipe and a second cold water pipe are arranged at a cold water output end of the lithium bromide-water refrigerating machine, the first cold water pipe being connected to the condenser to cool a gas in the condensation cavity, and the second cold water pipe being connected to the absorber to cool the sodium nitrate solution in the absorption cavity;
   wherein the absorber is provided with a gas return pipe that communicates an upper part of the absorption cavity and the evaporation cavity, and the exhaust pipe is provided with a bypass pipe that is communicated with the gas return pipe.

2. The refrigeration system of claim 1, wherein the heat source is a hot water pipeline has a temperature of 110° C. or higher.

3. The refrigeration system of claim 1, wherein the condenser is provided with an inclined gas inlet pipe, a low end of the gas inlet pipe being connected to the exhaust pipe, and a high end of the gas inlet pipe being located inside the condensation cavity.

4. The refrigeration system of claim 3, wherein the first cold water pipe is provided with a coil in the condensation cavity.

5. The refrigeration system of claim 1, wherein the bypass pipe has an S-shaped pipe section, and a high end of the S-shaped pipe section is connected to the gas return pipe.

6. The refrigeration system of claim 5, wherein an upper end of the gas return pipe is an inclined pipe that is arranged obliquely, and a high end of the inclined pipe is connected to the evaporation cavity.

7. The refrigeration system of claim 6, wherein a low end of the inclined pipe has a bent section.

8. The refrigeration system of claim 1, wherein the reflux pipeline is inclined, and a low end of the reflux pipeline is connected to the liquid storage cavity.

9. The refrigeration system of claim 1, wherein the lithium bromide-water refrigerating machine comprises a second generator, which is connected to the heat source to realize heating.

10. The refrigeration system of claim 9, wherein cold water output from the lithium bromide-water refrigerating machine has a temperature of 7° C. to 9° C.

* * * * *